United States Patent [19]

Suzuki et al.

[11] Patent Number: 5,020,509
[45] Date of Patent: Jun. 4, 1991

[54] HEATING ELEMENT

[75] Inventors: Ryoichi Suzuki; Hiroyuki Kondo; Susumu Mizunuma, all of Kawasaki, Japan

[73] Assignees: Nippon Steel Corporation; Nissin Food Products Co., Ltd.; Nitto Seiki Co., Ltd., Japan

[21] Appl. No.: 439,405

[22] PCT Filed: Mar. 17, 1989

[86] PCT No.: PCT/JP89/00293
 § 371 Date: Nov. 17, 1989
 § 102(e) Date: Nov. 17, 1989

[87] PCT Pub. No.: WO89/08804
 PCT Pub. Date: Sep. 21, 1989

[30] Foreign Application Priority Data
Mar. 18, 1988 [JP] Japan .................................. 63-63524
May 17, 1988 [JP] Japan .................................. 63-118377

[51] Int. Cl.⁵ .............................................. F24J 1/00
[52] U.S. Cl. ..................... 126/263; 126/262; 252/70
[58] Field of Search ............... 126/368, 263, 262, 206; 252/70; 44/506, 42–45; 102/275.1, 275.8

[56] References Cited
U.S. PATENT DOCUMENTS
2,914,061 11/1959 Del Raso .......................... 126/262
4,013,061 3/1977 Trumble et al. ............... 126/263 X
4,664,674 5/1987 Oftedal et al. ................... 126/263 X
4,722,323 2/1988 Oblon .................... 126/263
4,819,612 4/1989 Okamoto et al. ............... 126/262 X FOREIGN PATENT DOCUMENTS
9013782 4/1987 Australia.

OTHER PUBLICATIONS
European Search Report, PCT/JP89/00293, (6-1989).

Primary Examiner—Larry Jones
Attorney, Agent, or Firm—Pollock, Vande Sande & Priddy

[57] ABSTRACT

The present invention relates to a heating device comprising a heat generating portion composed of a mixture of at least of ferric oxide, cupric oxide and trilead tetroxide powder and powder of silicon and/or silicon-iron alloy, a firing portion disposed contiguous to said heat generating portion and constituted by mixing boron or aluminum powder with at least one of ferric oxide, cupric oxide, barium peroxide and strontium peroxide powder, and an igniting portion situated adjacent to said firing portion and composed of a mixture of red phosphorus and potassium chlorate which is ignited by frictional heat or sparks of a flint. This heating device is capable of quick and easy heating of an object to be heated with no need of using any extraneous heating means. The invention also provides an instantaneous heater utilizing the heating device.

11 Claims, 6 Drawing Sheets

HEATING ELEMENT

TECHNICAL FIELD

This invention relates to a heating device for quickly heating liquids such as water, oil, etc., and solid matters. More particularly the invention pertains to a heating element which is capable of effecting quick heating with no need of using generally used heating means such as electrical means, combustible gases and solid fuels.

BACKGROUND ART

Electricity, combustible gases, and liquid and solid fuels comprising hydrocarbons are generally used as heating means for heating liquids and solid materials. As a specific heating technique, hydration reactions of calcium oxide, calcium chloride, aluminum or the like are utilized for generating heat (see Japanese Utility Model Application Kokai (Laid-Open) Nos. 60-70235, 61-89332, 62-93654, etc.).

Lately, as a more specific heating medium, there has been proposed a heating device comprising a mixture of red lead oxide powder and silicon powder packed into an elongated tube, such as adopted in a portable boiler-warmer disclosed In Japanese Patent Application Kokai (Laid-Open) No. 52-19358.

Commonly used electricity and combustible gases are very convenient for indoor use, but their outdoor utilization involves many inconveniences. On the other hand, liquid and solid fuels using hydrocarbons are poor in portability since the equipment needs to be enlarged for accelerating the heating speed. Also, difficulties are involved in their outdoor use in a rainy or windy days.

The heating element utilizing heat generation by a hydration reaction of calcium oxide, calcium chloride or aluminum is suited for outdoor use, but it has the drawbacks that the heating speed is relatively slow and that the amount of heat obtainable per unit volume of the calorific agent is very low.

The portable boiler-warmer making use of a calorific agent comprising a mixture of red lead oxide powder and silicon powder packed into an elongated tube (Japanese Pat. Application Kokai No. 52-19358) is fit for either indoor or outdoor use for boiling of water or oil and heat retention. In the case of this device, however, it is unavoidable that the whole casing is relatively enlarged in size. Also, its use is limited to some specific heating purposes, and further the structure of the container is complicated. In addition, the calorific agent itself has the problems of involving troublesomeness in packing it into an elongated tube and the concomitant high production cost. Also, due to the nature of the calorific agent, it needs to apply heating for a while by an electric heater or a lighter for effecting ignition. Thus, a large amount of heat is needed for igniting the calorific agent, which means poor ignitability of the agent.

DISCLOSURE OF THE INVENTION

For the purpose of enabling quick heating of liquids or solid materials in use either indoors or outdoors, the present invention is designed to provide a heating device which is capable of easy and quick firing and heating without generating any odious smell during combustion, even at a site where no electricity or gas is available, and which is also small in size, hence handy to carry and low in cost.

As a result of many experiments and studies on the heaters in which a large amount of heat can be generated by a calorific agent and which is easy to handle and low in cost, the present inventors have succeeded in developing a heating device consisting of a heat generating portion composed of a mixture of at least one of ferric oxide, cupric oxide and trilead tetroxide powder and powder of silicon and/or silicon-iron alloy; a firing portion disposed contiguous to said heat generating portion and constituted from, a mixture of powder of boron and/or aluminum which ignites at a high temperature but on application of a small amount of heat and at least one of ferric oxide, cupric oxide, barium peroxide and strontium peroxide powder; and an igniting portion situated adjacent to said firing portion: a casing possessing said heating device being disposed at the bottom, a side or periphery of the casing and having a section for receiving the object to be heated: and an instantaneous heater having said heating device set in a metallic casing having a small hole formed at a part of its wall so that ignition can be effected by an operation from the outside of the casing through said small hole.

The heating device according to this invention comprises a heat generating portion composed of the materials which, although relatively hard to ignite, are low in cost, high in safety and capable of generating a sufficient amount of heat, a firing portion situated contiguous to said heat generating portion and capable of easily taking fire and instantaneously causing said heat generating portion to generate heat and to perform heating, and an igniting portion disposed in close adjacency to said firing portion and capable of infallibly igniting said firing portion on being rubbed. This heating device is capable of generating a large amount of heat in a short time. The generated heat is quickly and efficiently transmitted through the wall surface of the well heat-conductive metallic casing, a plate, wire gauze or the like to the object to be heated, so that said object can be heated in a very short time with a minimum of heat loss.

This heating device, in practical use thereof, is properly varied in the amounts of its constituents and in its general configuration in conformity to the purpose of use, the place of use, kind of the object to be heated, etc. Typical examples of the object to be heated are the liquids such as water, oil, etc., and foods (such as Chinese vermicelli, soup, etc.).

As for the form of the casing in which said heating device is set, it may be basically of an encapsulating type, bottom-setting type, peripheral heating type, indirect heating type, plate heating type, or other like types.

In the instantaneous heater according to the present invention, the small hole formed in the wall of the metallic casing serves for guiding to the outside a fine wire or stick used for operating the igniting portion and also functions as a gas outlet for arresting the rise of pressure in said casing after enkindling. In case the object to be heated is a liquid and the metallic casing is directly immersed in the liquid, said small hole may be replaced by a fine tube designed to prevent the liquid from flowing into said casing. Practically, one or two of such small hole or fine tube is provided.

In case a solid object is heated by the present heater or in case the object to be heated is a liquid but it won't flow into the casing, the present heater having said small hole or holes is used in close attachment to the object to be heated. In this case, both heater and object to be heated are preferably covered with a heat insulator except for the area of close attachment where heat transfer is effected, since such covering minimizes heat loss and improves heating efficiency.

On the other hand, in case the present heater is used for heating a liquid such as water or oil with the heater immersed in the liquid, a fine tube or tubes are provided to the heater for preventing the liquid (object to be heated) from flowing into the metallic casing of the heater. In this case, paper, glass, metal, porcelain or synthetic resin is used for the casing in which the object to be heated is placed, and the igniting portion is caused to ignite by giving friction effected by an operation from the outside of the container, such as pulling, pushing or turning of a fine wire or the like emerging from an end of the fine tube. This ignition causes the firing portion to take fire, followed by instantaneous heat generation by the heat generating portion, thus allowing generation of a large volume of heat in an extremely short time. Said igniting portion is caused to ignite by means of friction. More specifically, such ignition is effected by letting the priming agent to ignite by frictional heat or by rubbing the flint to generate sparks.

Since the generated heat is quickly and efficiently transferred to the object to be heated through the wall face of the well heat-conductive metallic casing the object can be heated in a very short time with a minimum of heat loss.

The small hole or fine tube is only required to be one through which a fine wire or the like can be taken out as described above and which is capable of releasing gases from the inside of the heater. As for the form of such a hole or tube, it may be circular or columnar with a diameter of about 1 to 10 mm or may take other suitable forms such as triangular, square, prismatic, etc.

BRIEF DESCRIPTION OF THE DRAWINGS

FIGS. 9 to 12 are schematic illustrations of the embodiments of instantaneous heater according to this invention.

BEST MODE OF CARRYING OUT THE INVENTION

The invention will be described more particularly below with reference to the accompanying drawings.

Figure 1:
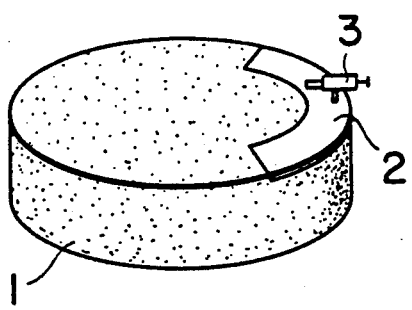
FIGS. 1, 2 and 3 show the basical structures of the different embodiments of heating device according to this invention.
Figure 2:
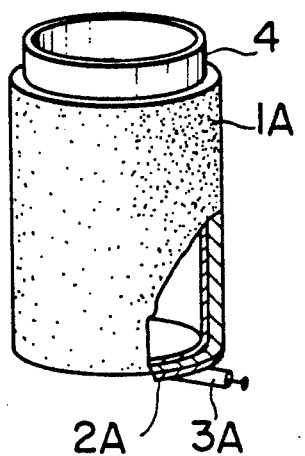
Figure 3:
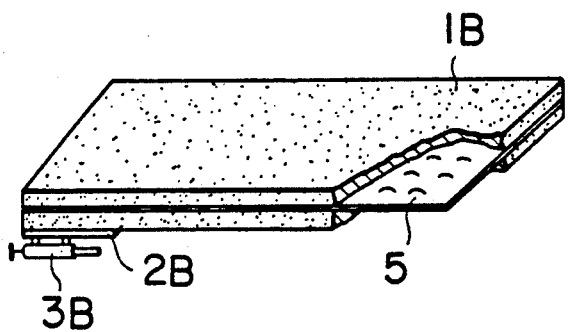

FIG. 1 shows a disc type heating device, FIG. 2 shows a bottomed hollow cylindrical type heating device, and FIG. 3 shows a thin plate type heating device. Needless to say, the heating device according to this invention is not limited to the types shown in the drawings but may take various other forms such as prismatic, rectangular parallelepipedal, etc., as desired.

The heating device shown in FIG. 1 comprises a disc-shaped heat generating portion 1, a firing portion 2 press molded integrally so that it is in contact with a part of the top face of said heat generating portion 1, and an igniting portion 3 disposed in adjacency to said firing portion 2. The combination of said heat generating portion 1 and firing portion 2 may not necessarily be of a structure in which the firing portion 2 is embedded in a part of the heat generating portion 1; the firing portion may be molded separately and disposed in contact with the top face, bottom face or side face of the heat generating portion 1. The mode of contact may be properly selected to suit the situation. The igniting portion 3 needs to be positioned adjacent to said firing portion 2 within a range of distance where the firing portion 2 can be infallibly fired by the ignition of the igniting portion 3.

The heating device shown in FIG. 2 consists of a bottomed generating hollow cylindrical heat generating portion 1A, a firing portion 2A generating attached to a part of the bottom face of said heat generating portion 1A by bonding or coating, and an igniting portion 3A situated in close adjacency to said firing portion 2A. This heating device, when formed with powder of a desired calorific agent, can hardly retain shape because of its small thickness, so that in accordance with this invention, a casing 4 molded from a thin plate of a metal such as iron is used as reinforcement, and a pulverized calorific agent suspended in a solvent (such as water, alcohol, resin, etc.) is coated to a predetermined thickness on the external surface of said casing, followed by drying. Press molding is another method available for producing the heating device of this invention.

The heating device shown in FIG. 3 is of a thin plate type, consisting of a thin plate-formed heat generating portion 1B, a firing portion 2B provided continuous to said heat generating portion, and an igniting portion 3B situated in close adjacency to said firing portion. Said thin plate-like heat generating portion 1B can be made by coating powder of a calorigenic agent kneaded with a solvent such as alcohol, water, etc., on one or both sides of an iron plate 5 (which may be, for instance, a 0.1 mm thick flat tin-plate sheet, or a plate with a high degree of surface roughness, a plate with unevenness on the surface, or a plate having a large number of pores, for increasing the bonding strength) and then drying the coat, or by placing powder of a calorigenic agent (afforded with a certain degree of fluidity) on said plate and pressing them into a thin plate. This provides the heating device with sufficient solidity even though it is a thin plate.

The heat generating portion (1, 1A, 1B) constituting a part of the heating device is composed of a mixture of powder of at least one of ferric oxide, cupric oxide and trilead tetroxide and powder of silicon and/or silicon-iron alloy, which is greater in heat of formation of oxide than the metals forming said oxides. The powder of silicon and/or silicon-iron alloy generates a large volume of heat of formation when it is oxidized by depriving the oxide of oxygen.

The firing portion (2, 2A, 2B) is provided for facilitating firing of the heat generating portion which requires a large amount of heat and relatively hard to fire. This portion is made from a mixture of boron and/or aluminum powder and at least one of ferric oxide, cupric oxide, barium peroxide and strontium peroxide. At this firing portion which, though requiring a high temperature, is easily fired with a small quantity of heat, a large volume of heat of formation is generated when boron and/or aluminum is oxidized with said compound (ferric oxide, cupric oxide, barium peroxide, etc.), so that this firing portion provided contiguous to the heat generating portion assures infallible firing of the heat generating portion. In case the heating element is used in a powdery form, the firing agent is made from aluminum, preferable with a small amount of boron as needed, and barium peroxide and strontium peroxide. In case the heating device is used in a solid form, the firing agent is made from boron, preferably with a small amount of aluminum as needed, and ferric oxide and/or cupric oxide.

The igniting portion (3, 3A, 3B) is easily ignited by friction. This portion is so designed that it may be ignited by the heat of friction or by the sparks generated by rubbing a flint. Ignition of the igniting portion proceeds through the firing portion to the heat generating portion to let it fire very easily to generate heat. In other words, the igniting portion and firing portion combines to enable quick and easy firing and calorification of the heat generating portion. For constituting such an igniting portion, an igniting agent made of a mixture of at least one kind of combustible substance such as red phosphorus, sulfur, arsenic sulfide, phosphorus sulfide, etc., and an oxidizing agent such as potassium chlorate, potassium perchlorate, potassium nitrate, etc., is spread on a sheet of thin paper (such as Japanese paper) having a width of about 5 to 20 mm and coiled around a fine metallic wire or string several turns so that the igniting agent will be entwisted into the contacting sections of said fine wire and thin paper. The igniting portion is properly fixed to the casing by a suitable fixing tube or other means. The fine wire or string is pulled, pushed or turned so as to generate frictional heat at its parts contacted with the paper, thereby causing ignition of the igniting agent made of said mixture. The igniting portion may comprise a spark generating mechanism constituted with a flint (REM, Fe or Mg alloy, etc.) and a hard substance such as iron, which is further described later.

Since the materials used for said heat generating portion (1, 1A, 1B) and firing portion (2, 2A, 2B) are originally powdery, they are blended at the compositions mentioned before, then added and kneaded with a proper binder and/or other additives, and press molded into a desired form such as block, plate, cylinder, etc., or the mixture is packed into a container made of iron or stainless steel.

The modes of practical use of said heating device set in the casing having a heating function are shown in FIGS. 4 to 8.

Figure 4:
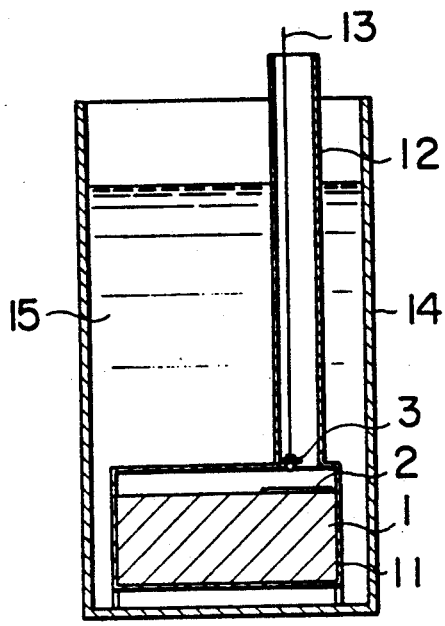
FIGS. 4 to 9 shows the embodiments of casing with heating function adapting a heating device according to this invention.

FIG. 4 illustrates a mode of use in which a heater constituted by packing a heating device of this invention in a casing 11 is placed in a container having a housing portion of the object to be heated (liquids such as water, oil, etc., or solid materials) and operated to generate heat. A heating device of the form shown in FIG. 1 is packed into a casing 11 provided with a fine tube 12, and a fine wire 13 extending from the igniting portion 3 is passed outside through said fine tube 12. A heater incorporated with such heating device is set in a container 14. Then a liquid to be heated 15 is put into said container 14, and the fine wire 13 is pulled to let the igniting portion 3 ignite, causing the firing portion 2 and heat generating portion 1 to fire successively to generate heat, thus heating the liquid 15 through the packed casing 11. The casing may be composed to be disposable so that it is thrown away after one time use, or said casing may be designed to be an opening and closing type so that the used heating device therein may be replaced with new one.

Figure 5:
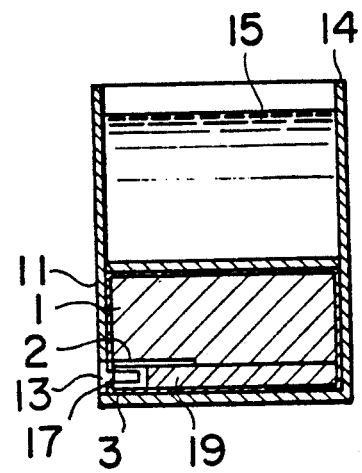

FIG. 5 illustrates a casing of the type in which the heating device is set at the bottom of the casing. In this type, the casing 14 having a section for receiving the object to be heated is separately provided with a heating device housing portion at the bottom. The heating device used here is of the type shown in FIG. 1. At a side close to the bottom of the casing 14 is provided a small hole 17 intended to allow operation for the igniting portion from the outside. A fine wire 13 passed outside through said small hole 17 is pulled, pushed or turned to cause successive firing of the igniting portion 3, firing portion 2 and heat generating portion 1 to generate heat by which to heat the object 15. In this mode of use, too, the casing may be composed to be either disposable or usable repeatedly. Numeral 19 in the drawing denotes an insulator.

Figure 6:
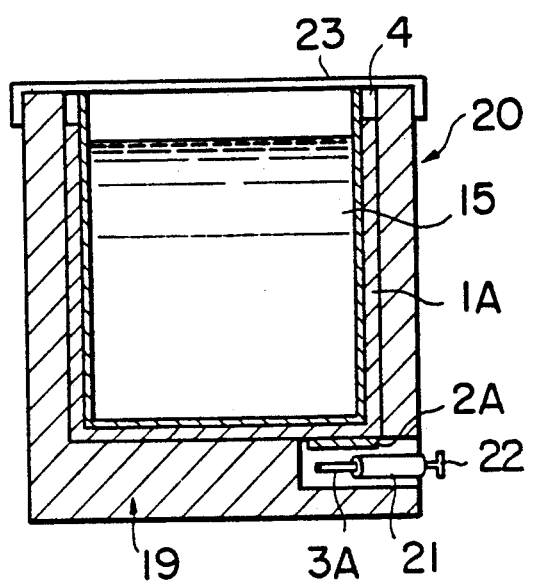

FIG. 6 illustrates a peripheral heating type which is suited for effecting uniform heating of the object to be heated. In this mode of use, a heating device shown in FIG. 2 is used. A can 4 in the inside and the heat generating portion 1A are encompassed by an insulated casing 20, and a firing portion 2A is provided at the bottom of the heat generating portion. Situated in close adjacency to said firing portion is an igniting portion 3A constituted by providing an igniting agent and a sheet of thin paper at the end of a metallic wire held by a metallic or plastic fixing ring 21. The rear end of the metallic wire is extended outside of the casing and attached with a pull 22. The operator grips and pulls it to cause ignition by friction, letting the firing portion 2A and heat generating portion 1A fire to generate heat. Numeral 23 designates a cover.

Figure 7:
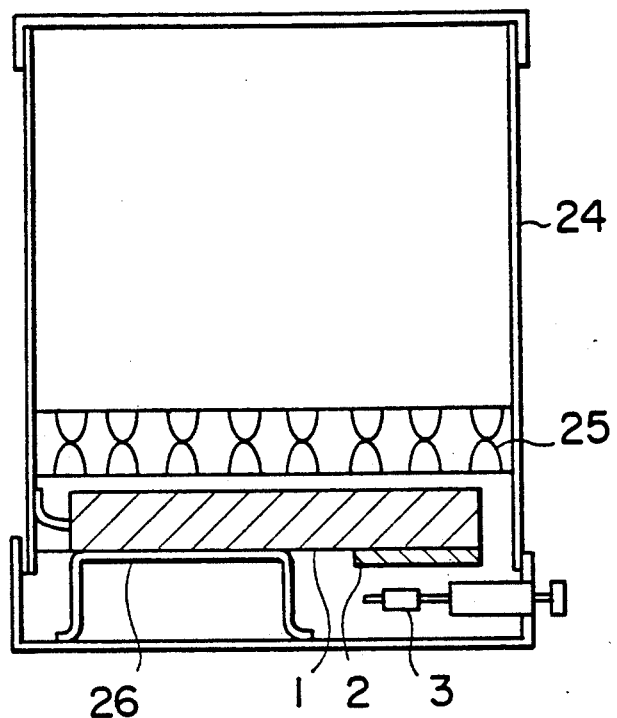

FIG. 7 shows an indirect heating type. This mode of use of the invention is suited when the object to be heated is a solid materials (for example, a lunch box) and it is desired to avoid any scorching. As shown in the drawing, a heat insulating layer 25 is provided at the bottom of a covered casing 24 in which the substance to be heated is contained, and a heating device of this invention is disposed beneath said insulating layer 25. The heating device used here is of the same type as shown in FIG. 1. The heating portion 1 is held by a holder 26 made from a metallic plate, metallic wire, ceramic or the like and so arranged that said portion will make point or line contact with the bottom of the casing so as to minimize heat transfer. The mechanisms of the firing portion 2 and igniting portion 3 and their interrelation are the same as those of the heating device shown in FIG. 6. The insulating layer 25 is so designed that the object to be heated is directly placed thereon. It is constituted by a heat insulating material such as steel wool, honeycomb structure insulator, mica, ceramic powder, etc., and a pneumatic structure layer. The surface temperature of the insulating layer is adjusted by the type of the insulating material used and the thickness of the layer.

Figure 8:
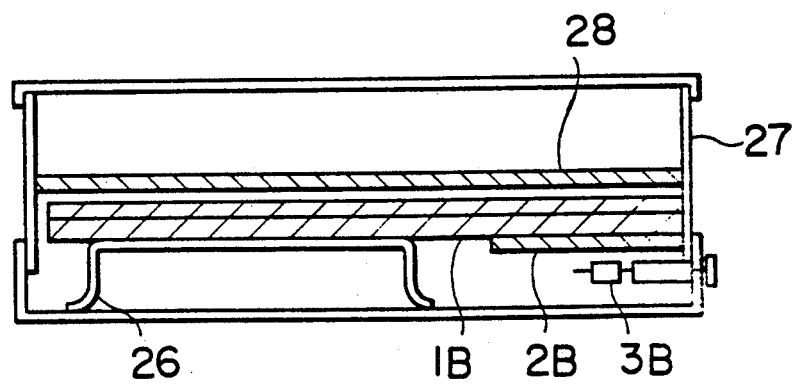
Figure 9:
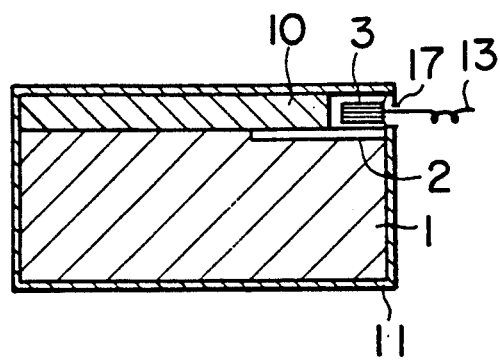

FIG. 8 illustrates a flat plate heating type which is suited for heating an object having a relatively wide area such as lunch box. In this type, a thin plate-like heat generating portion 1B shown in FIG. 3 is disposed beneath the bottom plate of a covered shallow casing 27 having a section for receiving the object to be heated, and a firing portion 2B is provided contiguous to said heat generating portion and an igniting portion 3B in close proximity to said firing portion. The igniting portion 3B is the same in structure as those shown in FIGS. 6 and 7. As this igniting portion is ignited, the heat generating portion 1B is energized to generate heat to heat an iron plate 28 of the casing, which then heats the object to be heated which is placed on said iron plate.

FIGS. 9 to 12 show the various embodiments of instantaneous heater according to this invention.

In a circular or square-shaped metallic casing 11 are packed a heat generating portion 1 and thereon a firing portion 2 which is easier to fire than the calorific agent, and an igniting portion 3 is provided adjacent to said firing portion. A fine metallic wire or filament 13 is passed outside through a small hole 17 or a fine tube 12, said wire or filament 13 being operated from the outside of the casing 1 to generate a frictional heat by which the igniting portion 3 is ignited.

An end of said fine wire or filament 13 runs into the inside of the igniting portion 3 so that when said wire or filament is pulled, frictional heat is generated in the igniting portion to let it ignite, causing successive firing of the firing portion 2 and heat generating portion 1. In case the fine wire or filament may be short as in the example shown in FIG. 9, said wire or filament may be replaced by a stick-like piece of a hard material, such as pin, which is run into the igniting portion and pulled, pushed or turned to cause firing by friction.

Figure 11:
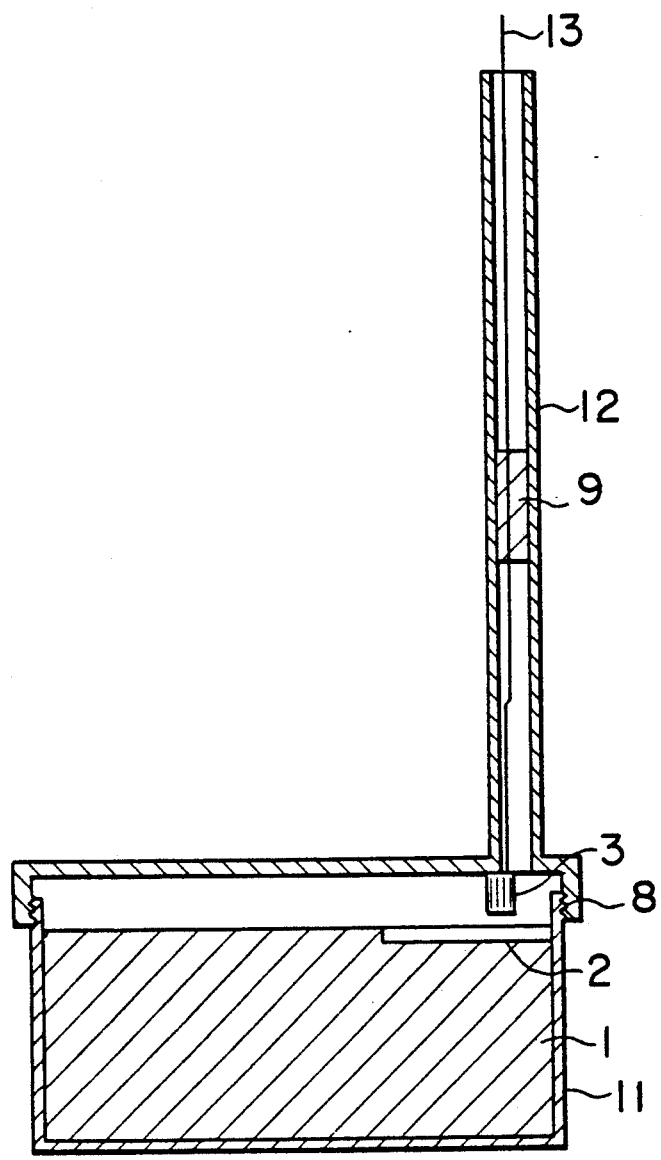

In order to remove the smoke which is produced in a small amount in the heater, a filter 9 made of glass wool, active carbon or the like may be provided in the fine tube as shown in FIG. 11.

Figure 12:
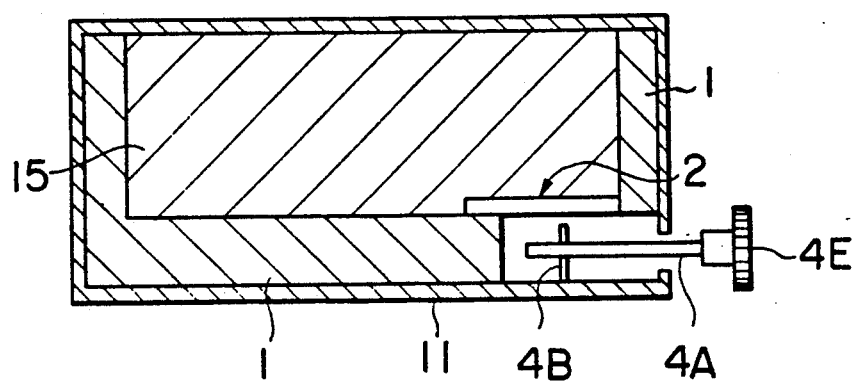
Figure 13:
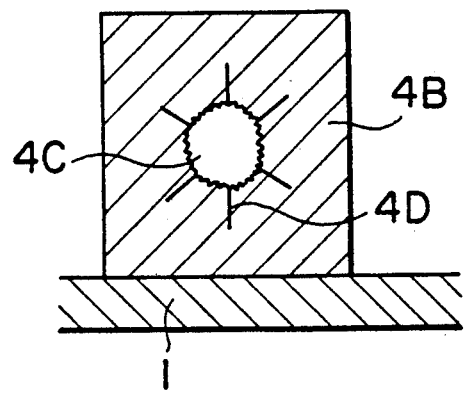
FIG. 13 is a frontal view of a part 4B of the heater of FIG. 12.

FIG. 12 illustrates an embodiment using a flint as igniting means. In this embodiment, there are provided a round bar of flint 4A composed of approximately 85% of a mixture of rare earth metals (REM) with the balance consisting essentially of iron and a trace amount of other material or materials such as Mg, and a hard iron plate 4B in which a jugged hole 4C is formed with a number of notches 4D being made radially around said hole. FIG. 13 is a frontal view of the iron plate 4B. A handgrip 4E may be provided on the flint as desired. The flint is pulled or pushed to generate sparks which ignite the firing portion.

Some embodiments of the present invention will be given below.

EXAMPLE 1

(1) Casing and object to be heated
Casing: a casing (80 mm in diameter and 130 mm high) having the structure shown in FIG. 4.
Object to be heated: water, 500 ml
(2) Heating device Heat generating portion: composed of a mixture of 70 g of ferric oxide ($Fe_2O_3$) powder and 30 g of ferro-silicon (75% silicon and 25% iron)
Firing portion: made of 0.5 g of a firing agent composed of 15% of aluminum powder, 3% of boron and the balance accounted for by an oxidizing agent consisting mainly of cupric oxide and small amounts of barium peroxide and strontium peroxide.
Igniting portion: an igniter made by wrapping 0.01 g of a mixture of red phosphorus and potassium chlorate around Japanese paper.
(3) Result
By pulling the fine wire extending from the igniting portion, the firing and heat generating portions were set off to generate heat, whereby the temperature of water which was 10° C. could be raised to 100° C. in four minutes.

EXAMPLE 2

(1) Casing and object to be heated
Casing: a casing (65 mm in diameter and 80 mm high) having the structure shown in FIG. 5 (thickness of heat insulating layer: 10 mm; thickness of heating device housing section: 20 mm)
Object to be heated: 200 cc of tea
(2) Heating device
Heat generating portion: composed of 40 g of a mixture of 28 g of ferric oxide ($Fe_2O_3$) powder and 12 g of ferro-silicon (75% silicon and 25% iron)
Firing portion: made of 0.2 g of a calorific agent comprising 15% of aluminum powder, 3% of boron and remaining percentage of an oxidizing agent consisting mainly of barium peroxide and containing small amounts of cupric oxide and strontium peroxide.
Igniting portion: a spark generator consisting of a flint (REM, Fe or Mg alloy) and hard Fe
(3) Result
By pulling the fine wire lead out from the igniting portion, the firing and heat generating portions were set off to generate heat, whereby the temperature of tea could be raised to 100° C. in two minutes.

EXAMPLE 3

(1) Casing and object to be heated
Casing: a casing (170 mm in diameter and 30 mm high) having the structure shown in FIG. 8 (thickness of heating device housing section: 20 mm; heating device comprising a 0.2 mm tinplate sheet with a 2 mm thick layer of a calorific agent laminated on both sides of the tinplate sheet)
Object to be heated: 500 g of eel and rice in a lunch box
(2) Heating device
Heat generating portion: composed of 50 g of a mixture of 35 g of ferric oxide ($Fe_2O_3$) powder and 15 g of ferrosilicon (75% silicon and 25% iron) powder
Firing portion: made of 0.3 g of a firing agent comprising 15% of aluminum powder, 3% of boron and a complement (to 100) of an oxidizing agent composed mainly of cupric oxide and small amounts of barium peroxide and strontium peroxide
Igniting portion: an igniter made by wrapping 0.01 g of a mixture of red phosphorus and potassium chlorate around Japanese paper.
(3) Result
By pulling the fine wire of the igniting portion, the firing and heat generating portions were set off to generate heat, whereby the lunch could be warmed to 50° C. in five minutes.

EXAMPLE 4

Figure 10:
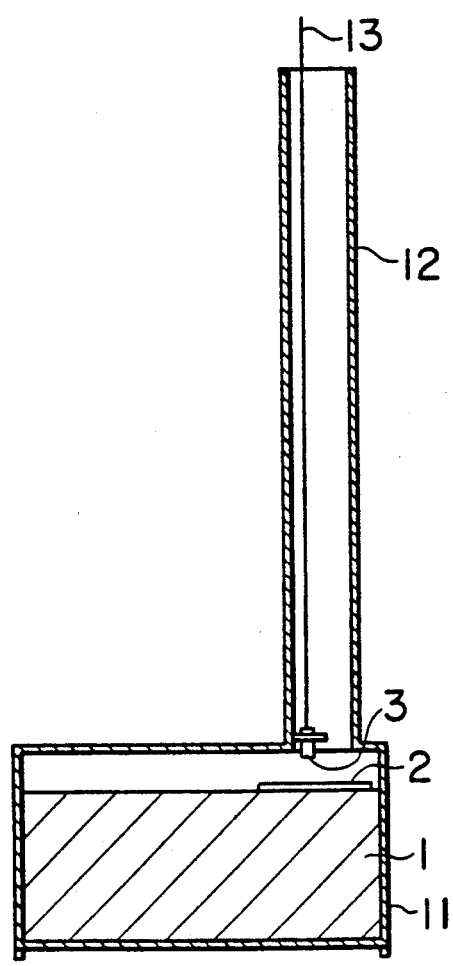

A heating portion was made from a mixture of 70 g of ferric oxide ($Fe_2O_3$) and 30 g of ferrosilicon (75% silicon and 25% iron) powder. Overlaid on said heat generating portion was a firing portion (0.5 g) composed of 15% of aluminum powder, 3% of boron and a complement of an oxidizing agent composed mainly of barium peroxide and containing small amounts of cupric oxide and strontium peroxide. Further, an igniting portion was made by wrapping 0.01 g of a mixture of red phosphorus and potassium chlorate around a sheet of Japanese paper, and said portions were set in an iron-made casing as shown in FIG. 10 to fabricate a heater.

This heater was placed in a glass container containing 500 ml of water, and the calorific agent was ignited by pulling the fine wire 13. By this, the temperature of water which was 10° C. could be raised to 100° C. in one minute.

EXAMPLE

A heat generating portion was constituted from a mixture of 79.2 g of ferric oxide ($Fe_2O_3$) powder and 20.8 g of silicon powder, and above said heating portion was overlaid 0.5 g of a firing agent comprising 15% of aluminum powder, 3% of boron and a complementing percentage of an oxidizing agent composed mainly of barium peroxide and containing small amounts of cupric oxide and strontium peroxide. These were press molded into pellets measuring 50 mm in diameter and about 15 mm in thickness. Further, an igniting portion was formed by wrapping 0.02 g of red phosphorus and potassium chlorate around a sheet of Japanese paper. An assembly of said heating, firing and igniting portions was set in an iron-made casing as shown in FIG. 11 to fabricate a heater.

This heater was placed in a glass container containing 600 ml of water, and the calorific agent was ignited by pulling the wire 13. A filter made of a 0.2 g glass wool—0.5 g active carbon—0.2 g glass wool laminate was provided in the fine tube. There was observed no smoke from the fine tube, and 10° C. water could be heated to 100° C. in about one minute.

EXAMPLE 6

The pellets of the same kinds and same amounts of calorific agent and firing agent as used in Example 5 and an igniting portion also similar to the one used in Example 5 were set in an iron-made casing to make a heater. The heater was placed on a 100 mm × 100 mm × 10 mm thick iron plate, and the heating device was fired to heat the iron plate. As a result, the lower part of the iron plate was heated to 300–350° C. in approximately one minute.

EXAMPLE 7

Used as calorific agent was a mixture of 70 g of ferric oxide ($Fe_2O_3$) powder and ferrosilicon (75% silicon and 25% iron) powder. Placed beneath said calorific agent was 1.5 g of a firing agent consisting of 13% of boron powder and 87% of an oxidizing agent composed mainly of cupric oxide. These compounds were press molded into pellets. These pellets and an igniter using a flint shown in FIGS. 12 and 13 were set in an iron-made casing as shown in FIG. 12 to fabricate a heater.

This heater was placed in a glass container holding 500 ml of water, and the flint was pressed in to cause ignition and heat generation. As it turned out, 10° C. water could be heated to 90° C. in three minutes.

EXAMPLE 8

(1) Casing and object to be heated
Casing: a casing (84 mm in diameter and 150 mm high) having the structure shown in FIG. 5, with an igniter shown in FIG. 12 being secured to the back side of the top can cover with an adhesive tape
Object to be heated: 65 g of instant noodle (Chinese vermicelli) with 10 g of soup and ingredients and 310 ml of water
(2) Heating device
Heat generating portion: made from a mixture of 56 g of ferric oxide ($Fe_2O_3$) powder and 24 g of ferro-silicon (80 wt. % silicon and 20 wt. % iron) powder
Firing portion: made from 1.2 g of powder comprising 12% by weight of boron and 85% by weight of ferric oxide
Igniting portion: hard steel plate shown in FIG. 13

(3) Heat insulating material: silica-alumina fiber in the area closely adjacent (about 5 mm in thickness) to the heating element and glass wool (about 20 mm in thickness) in the area therebelow
(4) Result The top cover of the can was opened to take out the igniter 4A, 4E, and after pouring water, the igniter was inserted from a side of the can bottom to cause ignition and consequent firing of the firing portion and heat generating portion. As a result, the temperature of the object to be heated could be raised to 100° C. in approximately 3 minutes. The instant noodle thus restored to its edible state was better in shape and taste than the one prepared by pouring hot water as ordinarily done.

As described above, the heating device according to this invention consists of a heat generating portion which is relatively hard to fire, low in combustion temperature, high in safety and low in cost, a small amount of a firing agent (constituting a firing portion) which is although relatively high in cost, and a simple igniting portion for firing said firing portion, so that it is possible with this heating device to heat an object to be heated in a very short time and at low cost. Therefore, by making use of this heating element, there can be provided a small-sized portable heating equipment.

What is claimed is:

1. A heating device comprising a heat generating portion comprising a mixture of at least one of ferric oxide, cupric oxide and trilead tetraoxide powder and powder selected from the group consisting of silicon, silicon-iron alloy and mixture thereof, a firing portion disposed contiguous to said heat generating portion and comprising of a mixture of a member selected from the group consisting of boron, aluminum powder and mixture thereof and at least one of ferric oxide, cupric oxide, barium peroxide and strontium peroxide powder, and an igniting portion situated adjacent to said firing portion and said igniting portion generating frictional sparks of a flint to set off said firing portion.

2. THe heating device according to claim 1, wherein the heat generating portion has a shape selected from the group consisting of rectangular parallelepidepal, prismatic, disc-shaped, thin plate-shaped and hollow cylindrical, and the firing portion is integrally molded contiguous to said heat generating portion.

3. A container having a heating function in which a heating device set forth in claim 2 is set at a location selected from the group consisting of the bottom, a side and periphery of the container having a section for receiving the object to be heated.

4. An instantaneous heater of a structure in which a heating device set forth in claim 2 is set in a metallic casing and a small hole is formed at a part of the wall of said metallic casing, said small hole being designed to allow performing an igniting operation there-through from the outside of the casing.

5. A container having a heating function in which a heating device set forth in claim 1 is set at a location selected from the group consisting of the bottom, a side and periphery having a section for receiving the object to be heated.

6. An instantaneous heater of a structure in which a heating device set forth in claim 1 is set in a metallic casing and a small hole is formed at a part of the wall of said metallic casing, said small hole being designed to allow performing an igniting operation therethrough from the outside of the casing.

7. An instantaneous heater according to claim 6, wherein the small hole formed at a part of the metallic casing wall is a small tube extending through the wall.

8. An instantaneous heater according to claim 7, wherein the heating device is situated at a location selected from the group consisting of the bottom, a side and periphery of the casing having a section for receiving the object to be heated.

9. The heater of claim 7 wherein said small tube has a diameter of about 1 to 10 mm.

10. An instantaneous heater according to claim 6, wherein the heating device is situated at a location selected from the group consisting of the bottom, a side and periphery of the casing having a section for receiving the object to be heated.

11. The heating device of claim 1 wherein said igniting portion comprises a mixture of red phosphorous and potassium chlorate.

* * * * *